(12) United States Patent  
Saxena et al.

(10) Patent No.: US 6,259,449 B1  
(45) Date of Patent: Jul. 10, 2001

(54) INTEGRATED COMMUNICATION CENTER (75) Inventors: Parichay Saxena, Milpitas; Xiaohui Zhang, Fremont; Hiroaki Nakano, San Francisco, all of CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 08/988,527

(22) Filed: Dec. 10, 1997

(51) Int. Cl.[7] .................................................. H04L 12/28
(52) U.S. Cl. ............................................ 345/356; 345/346
(58) Field of Search .................................... 345/356–357, 345/339, 329, 327–328, 330–338, 340–341, 342–347, 348–349, 350–351, 352–355, 145–146; 364/514; 717/10

(56) References Cited

U.S. PATENT DOCUMENTS

| | | | |
|---|---|---|---|
| 4,575,579 | * 3/1986 | Simon et al. | 178/4 |
| 5,159,685 | * 10/1992 | Kung | 395/575 |
| 5,325,423 | * 6/1994 | Lewis | 379/90 |
| 5,442,788 | * 8/1995 | Bier | 395/650 |
| 5,513,126 | * 4/1996 | Harkins et al. | 364/514 |
| 5,548,506 | * 8/1996 | Srinivasan | 364/401 R |
| 5,742,808 | * 4/1998 | Hasuo | 395/601 |

OTHER PUBLICATIONS

Ring Central, Version 3.0, ring Zero systems, inc.—PC Telephony into the 21st Century.

* cited by examiner

Primary Examiner—Steven Sax  
(74) Attorney, Agent, or Firm—Blakely, Sokoloff, Taylor & Zafman LLP (57) ABSTRACT

A system for integrating communication programs in a computer is disclosed. A graphical user interface includes a first interface screen which provides display areas for information regarding files and messages sent and received by the computer. The first interface screen also includes option buttons which invoke one or more communication programs executable by the computer. A second interface screen is displayed when the appropriate option button is selected. The second interface screen is depicted as an extension panel connected to the first interface screen. The second interface screen includes information relating to the status of data files or messages sent or received by the computer, or information relating to the identity of remote devices accessible by the computer over a network or phone connection.

23 Claims, 10 Drawing Sheets

INTEGRATED COMMUNICATION CENTER

FIELD OF THE INVENTION

The present invention relates generally to the field of graphical user interfaces, and more particularly to integrating separate communication applications within a single user interface.

BACKGROUND OF THE INVENTION

With the advent of the modem and other network interface devices, the personal computer has evolved from a personal productivity device to a communications gateway. As personal computers have become increasingly used for network and telephone based communication, many different communication programs, such as electronic mail (e-mail), Internet communication, fax, and even basic voice telephone communications have developed as popular applications for personal computers.

Presently, different communication applications for most personal and workstation computers are available as separate programs from different vendors, each with their own user interfaces, and command and data formats. Therefore, in order to use different communication applications, the user is forced to learn and access several different programs. For example, a user may use one program for e-mail, a separate program for fax, and a third program for web access. These programs require the user to initialize and bring up each of the programs to access the particular communication function. This requires the opening of separate application programs or windows, and the familiarization with different program interfaces and command conventions. The use of separate communication programs also requires the use of cumbersome translator programs if content from one communication medium is transferred via a different medium (e.g., fax to e-mail).

It is thus desirable to provide a system which integrates various communication applications available on a computer system.

It is further desirable to provide a graphical user interface which provides an intuitive and simple to use interface through which a user can access several separate and distinct communication programs.

SUMMARY OF THE INVENTION

The present invention discloses a graphical user interface which integrates separate communication applications in a unified interface. A graphical user interface includes a first interface screen which provides display areas for information regarding files and messages sent and received by a computer. The first interface screen also includes option buttons which invoke one or more communication programs executable by the computer. A second interface screen is displayed when an appropriate option button is selected. The second interface screen is depicted as an extension panel connected to the first interface screen. The second interface screen includes information relating to the status of data files or messages sent or received by the computer, or information relating to the identity of remote devices accessible by the computer over a network or phone connection.

In one embodiment of the present invention, the communication programs include a speaker phone, video phone, answering machine, fax, e-mail, and web browser all accessible through the integrated interface. In this embodiment, the main communication interface is depicted in the form of a cellular phone with a standard numeric keypad and display screens. Extension panel display screens corresponding to various communication functions such as messages, mailboxes, phone books, and greetings are displayed when the appropriate functions are selected in the main interface. The extension panels screens are displayed as physical extensions to the cellular telephone display, and can be revealed or hidden by a toggle option button.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A system for integrating various communication programs within a single unified graphical user interface is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form to facilitate explanation.

Hardware Overview

According to the present invention, a host computer system transmits and receives data over a computer network or standard telephone line. According to one embodiment, the steps of accessing, downloading, and manipulating the data, as well as other aspects of the present invention are implemented by a central processing unit (CPU) in the host computer executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to the present invention.

The instructions may be loaded into the memory of the host computer from a storage device, or from one or more other computer systems over a network connection. For example, a server computer may transmit a sequence of instructions to the host computer in response to a message transmitted to the server over a network by the host. As the host receives the instructions over the network connection, it stores the instructions in memory. The host may store the instructions for later execution or execute instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the host computer.

Figure 1:
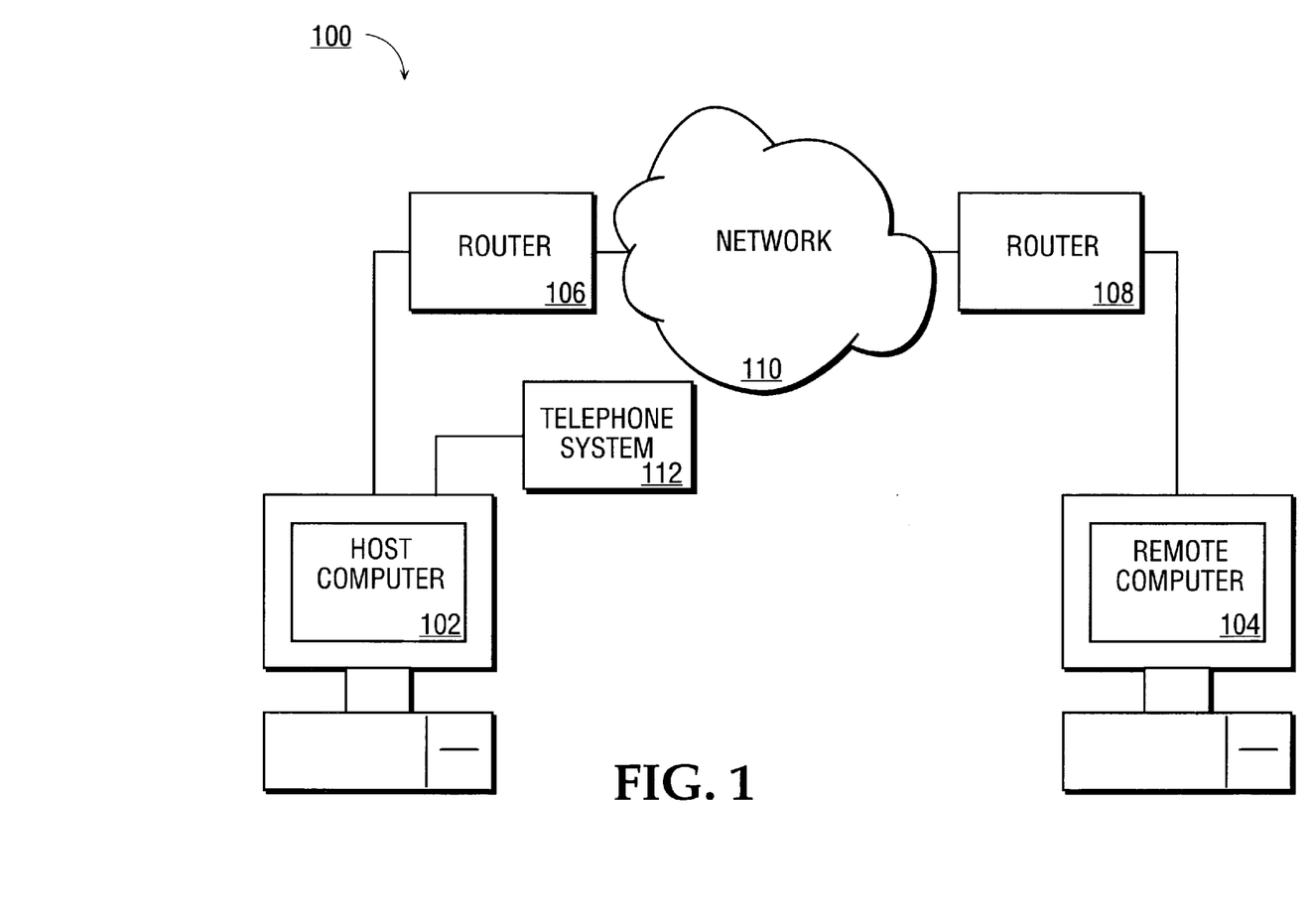
FIG. 1 illustrates host and remote computers connected over a network.

FIG. 1 illustrates a system 100 in which a host computer 102 is connected to a remote computer 104 through a network 110. The network interface between host computer 102 and remote 104 may also include one or more routers, such as routers 106 and 108, which serve to buffer and route the data transmitted between the host and client computers. Network 110 may be the Internet, a Wide Area Network (WAN), a Local Area Network (LAN), or any combination thereof. The remote computer 104 may be a World-Wide Web (WWW) server that stores data in the form of 'web pages' and transmits these pages as Hypertext Markup Language (HTML) files over the Internet network 110 to host computer 102. To access these files, host computer 102 runs a 'web browser', which is simply an application program for accessing and providing links to web pages available on various Internet sites. Host computer 102 is also configured to communicate to telephone system 112 through a telephone interface, typically a modem.

Figure 2:
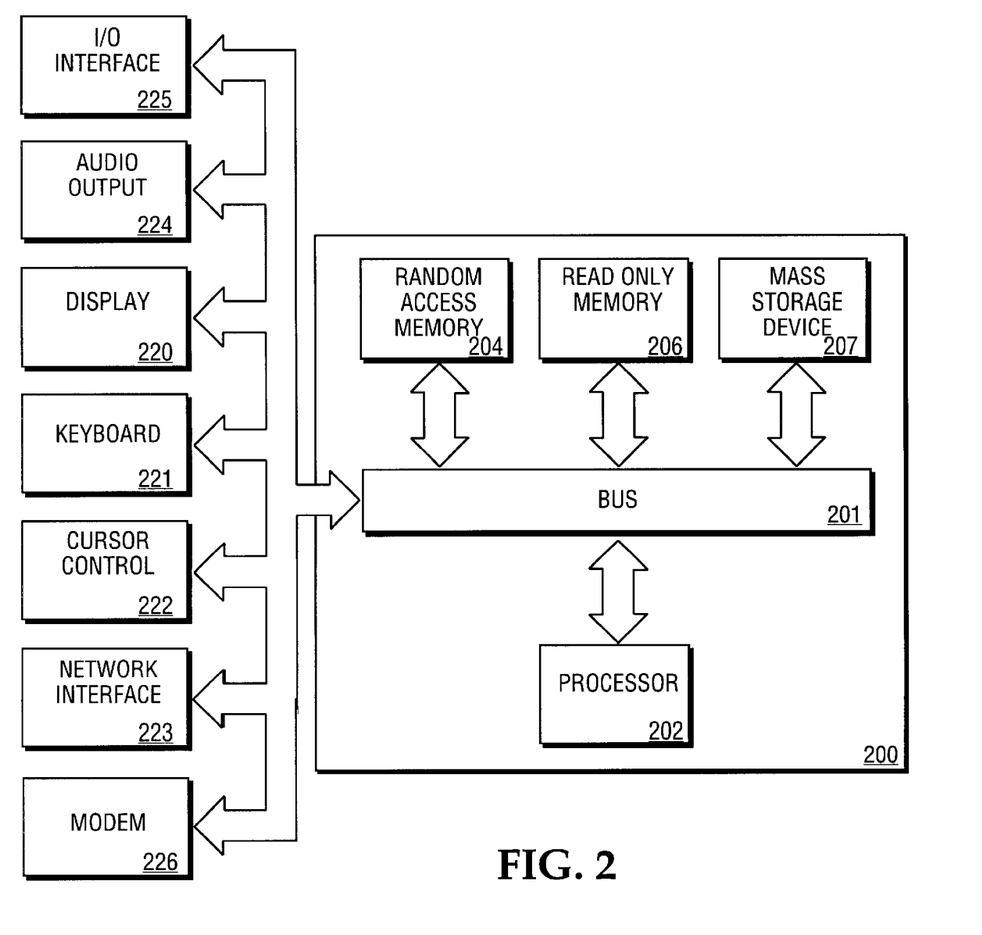
FIG. 2 is a block diagram of a host computer system which may be used to implement an embodiment of the present invention.

FIG. 2 is a block diagram of a representative networked computer, such as host computer 102 illustrated in FIG. 1. The computer system 200 includes a processor 202 coupled through a bus 201 to a random access memory (RAM) 204, a read only memory (ROM) 206, and a mass storage 207. Mass storage device 207 could be a disk or tape drive for storing data and instructions. A display device 220 for providing visual output is also coupled to processor 202 through bus 201. Keyboard 221 is coupled to bus 201 for communicating information and command selections to processor 202. Another type of user input device is cursor control unit 222, which may be a device such as a mouse or trackball, for communicating direction commands that control cursor movement on display 220. Also coupled to processor 202 through bus 201 is an audio output port 224 for connection to speakers that output audio signals produced by computer 200.

Further coupled to processor 202 through bus 201 is an input/output (I/O) interface 225, and a network interface device 223 for providing a physical and logical connection between computer system 200 and a network. Network interface device 223 is used by various communication applications running on computer 200 for communicating over a network medium and may represent devices such as an ethernet card, ISDN card, or similar devices.

Modem 226 interfaces computer system 200 to a telephone line and translates digital data produced by the computer into analog signals that can be transmitted over standard telephone lines, such as by telephone system 112 in FIG. 1. In an embodiment of the present invention, modem 226 provides a hardwired interface to a telephone wall jack, however modem 226 could also represent a wireless modem for communication over cellular telephone networks. It should be noted that the architecture of FIG. 2 is provided only for purposes of illustration, and that a host computer used in conjunction with the present invention is not limited to the specific architecture shown.

In one embodiment of the present invention, a unified graphical user interface program integrates various communication applications available on host computer 102. The integrated user interface (hereinafter referred to as the "integrated communication center") is independent of the physical layer governing the various communication media, and works seamlessly over several different physical layer protocols, such as Plain Old Telephone Service (POTS), ISDN, wireless telephone, cable modem, among others. Data translators provide the means to convert and transmit data from one communication application to any other communication application within the integrated communication system.

Figure 3:
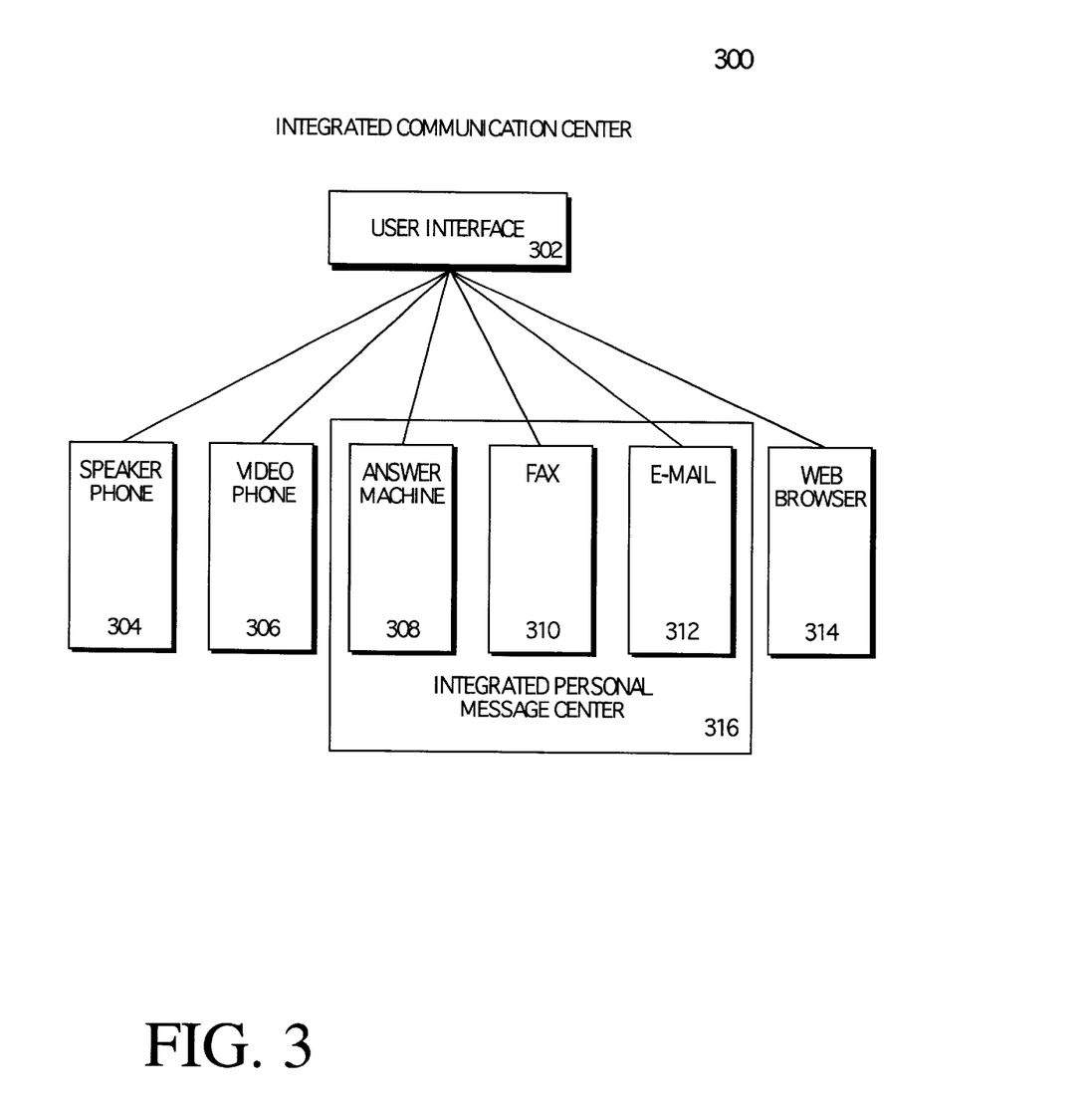
FIG. 3 is a block diagram of application programs within the integrated communication center according to one embodiment of the present invention.

FIG. 3 illustrates the organization of communication applications within the integrated communications center according to one embodiment of the present invention. The integrated communications center 300 includes a user interface 302 that provides access to various separate communication programs. These applications include a speaker phone 304, video phone 306, answering machine 308, fax 310, e-mail 312, and web browser 314. The answering machine, fax, and e-mail applications are organized into a functional unit, referred to as the "integrated personal message center" (IPMC) 316. Functional details for each of the applications within the integrated communications center will be provided in the discussion that follows.

Speaker Phone

In one embodiment of the present invention, the speaker phone application 304 of the integrated communication center 300 uses a sound card, speaker, and microphone in the personal computer to perform the functions of a traditional telephone handset. The speaker phone application accepts the user's voice input through an attached microphone, and transmits the other party's voice output through an attached speaker.

In one embodiment, the speaker phone within the integrated communication center is a full duplex system that supports the POTS (plain old telephone system) protocols, as well as Telephony API (application program interface) compliance (TAPI), and Unimodem /V Support. Within the integrated communication center, the speaker phone can be programmed to support caller ID functions and eliminate echo from the receiving telephone or remote computer. The caller ID function may be used in conjunction with a local database that provides access to the caller's name and other caller information for display on the computer monitor. The speaker phone can also be programmed with distinctive prompt association that allows a custom prompt to be played for each different caller identified.

The speaker phone may also be programmed to include several advanced features, such as a text-to-speech engine that can read text messages, Digital Simultaneous Voice and Data (DSVD) that allows the user to send a data file to a person while talking to that person over the speaker phone. Standard telephone company services, such as teleconferencing, call waiting, and call forwarding are also supported. The speaker phone could also be configured for handset support, this allows a standard telephone handset to be installed alongside the PC and provide the same telephone service.

In one embodiment of the present invention, the speaker phone is enabled by advanced technology provided by Windows 95 OSR-2 (Unimodem/V), Telephony API along with a voice modem, PC sound card and PC Multimedia extensions. This enabling technology allows the speaker phone within the integrated communications center to comply with full TAPI and Unimodem /V protocols, DSVD 1.2 and/or ITU-T V.70 standards, and standard audio compression mechanisms.

In an embodiment of the present invention, phone service to the speaker phone application is provided through a coax cable connected from a standard telephone wall jack to the host computer through a modem. Alternatively, a cellular phone and wireless modem may be used. In an alternative embodiment, phone service is provided through an ISDN line and an ISDN interface in the PC. In yet a further alternative, phone service for the speaker phone application is provided through an Internet Phone application.

Video Phone

In one embodiment of the present invention, the integrated communications center includes a video phone application 306. The video phone application of the integrated communication center uses a sound card, speaker, microphone, and video camera connected to the personal computer to receive and transmit voice and video data between the user and another video phone user. Although use of a digital video camera is preferred, support for an analog camera is available, but a video frame rate of 15 frames per second is required. Alternatively, a Universal Serial Bus (USB) camera can be used. A USB digital camera allows direct connection to the PC motherboard bus without any video capture hardware.

The video phone application features compliance with various video phone standards. For example, the video phone application is fully compliant with the ITU-T H.324 video phone standard, thus allowing communication with other H.324 compliant video phone systems. These other systems could be a remote computer in combination with a compatible modem or dedicated hardware, with support of data channel in addition to audio and video in an H.324 application stack. Other standards supported by the video phone application include the H.263 CIF/QCIF Video Compression, G.723 Audio Compression, H.223 Framing, and H.245 Control Protocols.

In one embodiment, the video phone can be configured to support a receive-only mode. Receive-only mode allows the user to receive video from the remote party even if the host computer is unable to capture and send local video or snapshot data to the remote party, for example, due to a lack of appropriate hardware such as a camera or a video capture card. The video phone application can also be configured to support a Voice Call First option. Voice Call First is an alternative extension to the standard H.324 Voice Call First mode. Using Voice Call First, the conference participants first establish a standard telephone call to which they may add a subsequent video connection. V.8bis modem procedures support for Voice Call First and capability exchange is required for this option. The video phone application also allows for local and remote view in which a display window of the user is displayed on the host computer monitor simultaneously with the display window for the remote speaker's image.

In an alternative embodiment of the present invention, the video phone application within the integrated communication center provides support for several additional features, such as MMX (Multimedia Extension) enhanced processor support to sense the presence of an MMX-enhanced processor and to deploy MMX-specific code to boost the video performance; white boarding, which allows the two participants to simultaneously view, edit, and annotate a document; video-conferencing; audio/video data streaming to a local disk drive; and remote camera control. The video phone application can also be configured to play a local AVI (Audio-Video Interface) file. Using this capability, the video phone accesses and plays an AVI file stored on the host computer and uses it as the video source.

In one embodiment of the present invention, the speaker phone is enabled by the H.324 international standard recommendation for audio/video transmission on low bit-rate terminals (POTS connections). The video phone application also supports H.263, the standard video CODEC (Coder/Decoder) required by the H.324 recommendation; G.723, the standard audio CODEC required by the H.324 recommendation; and the H.223 framing and H.245 control protocols required by the H.324 recommendation. The video phone may also be configured to support MMX extensions to certain processors to increase video signal processing performance in MMX-enhanced processors.

In an embodiment of the present invention, phone service to the video phone application is provided through an ISDN line and an ISDN interface in the PC. Alternatively, a coax cable/modem or cellular phone/wireless modem may be used. In yet a further alternative of the present invention, the video phone application is provided through an Internet Phone. A point-to-point or multi-point video conferencing through the video phone can also be established over a Local-Area Network, or over the Internet using TCP/IP (Transmission Control Protocol/Internet Protocol) networking.

Integrated Personal Messaging Center

In one embodiment, the integrated communication center includes an Integrated Personal Messaging Center (IPMC) 316, which includes access to data communication programs. The IPMC is a computer implemented extension of the traditional phone answering machine system, and provides a disk based message repository for various message data formats as well as multiple users. The IPMC integrates several different forms of message and communication data, and includes access to an answering machine application, an e-mail application, and a fax application. Thus, messages stored within the IPMC may be of various different formats, including voice, video, text (e-mail), or bitmapped data (faxes).

The IPMC also includes data translators that allow different types of messages to be stored, forwarded, attached, and otherwise processed with one another. For example, a fax message may be annotated with voice attachments, or an e-mail message can be forwarded as a fax.

Answering Machine

In one embodiment of the present invention, the answering machine application 308 within the integrated communications stores message data corresponding to the originating program as separate files on a disk drive connected to the host computer. The answering machine can be configured to receive and store audio data from the speaker phone application, video data from the video phone application, text data from the e-mail application and bitmapped graphic data from the fax application.

In one embodiment, the answering machine supports several organizational features, such as multiple folders or message boxes (for multiple users or multiple types of messages), inbound and outbound call logging, and message receipt notification. The answering machine can also be programmed to provide a personalized voice greeting, and prompt for speaker ID and password for message retrieval.

In an alternative embodiment of the present invention, the answering machine application within the integrated communications center includes several advanced features including speech-to-text conversion for dictation of messages, and remote message retrieval (retrieval of messages from another phone or networked computer).

Fax

In one embodiment of the present invention, the integrated communication center includes a fax application 310. The fax application converts text or graphic data produced by text or graphic processing programs on the computer into bitmapped images. In transmit mode, the fax application transmits these bitmapped images over a modem connected to the host computer to a remote fax machine or corresponding fax software in a remote computer. In receive mode, the fax application receives bitmapped data over the modem from a remote fax machine or computer. The fax application may be used in conjunction with an optical character recognition (OCR) program that extracts and converts bitmapped graphics data into computer readable text.

In one embodiment, the fax application within the integrated communications center includes several features including automatic fax tone recognition; multiple folders so that fax messages can be arranged in a hierarchical file cabinet; configuration of the fax application as a printer driver; fax receipt notification; and inbound and outbound fax logging.

In an alternative embodiment of the present invention, the fax application within the integrated communications center includes several advanced features, such as text-to-speech for output of OCR-translated text messages through the host computer's speaker; group faxing; and voice command support.

E-Mail

In one embodiment of the present invention, the integrated communication center includes an electronic mail (e-mail) application 312. The e-mail application uses a modem or network interface device connected to the host computer to transmit text messages produced by a word processing program on the host computer to a remote computer with a similar e-mail program. The e-mail program receives e-mail messages as ASCII text, which can be stored on a disk or accessed by a word processing or text viewing program. The e-mail program is modem API (MAPI) compliant to ensure compatibility with popular e-mail programs. The e-mail application includes several features, including multiple folders; data base links for an automated mailing list; e-mail receipt notification; and inbound and outbound e-mail logging.

In an alternative embodiment of the present invention, the e-mail application within the integrated communications center includes several advanced features, including speech-to-text conversion for dictation of e-mail messages; text-to-speech conversion for output of received e-mail messages through the host computer's speaker; remote retrieval; and voice command support.

Web Browser

In one embodiment, the integrated communication center provides a web browser 314 which is a program that enables users to access server sites on the World-Wide Web. The web browser establishes a connection with an Internet service provider (ISP) which provides access to web sites on the Internet. In one embodiment of the present invention, current standard browsers (e.g., Netscape Navigator) are supported. The web browser application within the IPMC allows a user to store a web site in the message center address book, and automatically access the web site without needing to separately launch the browser.

In an alternative embodiment of the present invention, the web browser application within the integrated communications center includes several additional features, such as, voice-based navigation for hands-free web access, and text-to-speech capability for output of audio content on a web site through the host computer's speaker.

Graphical User Interface

Figure 4:
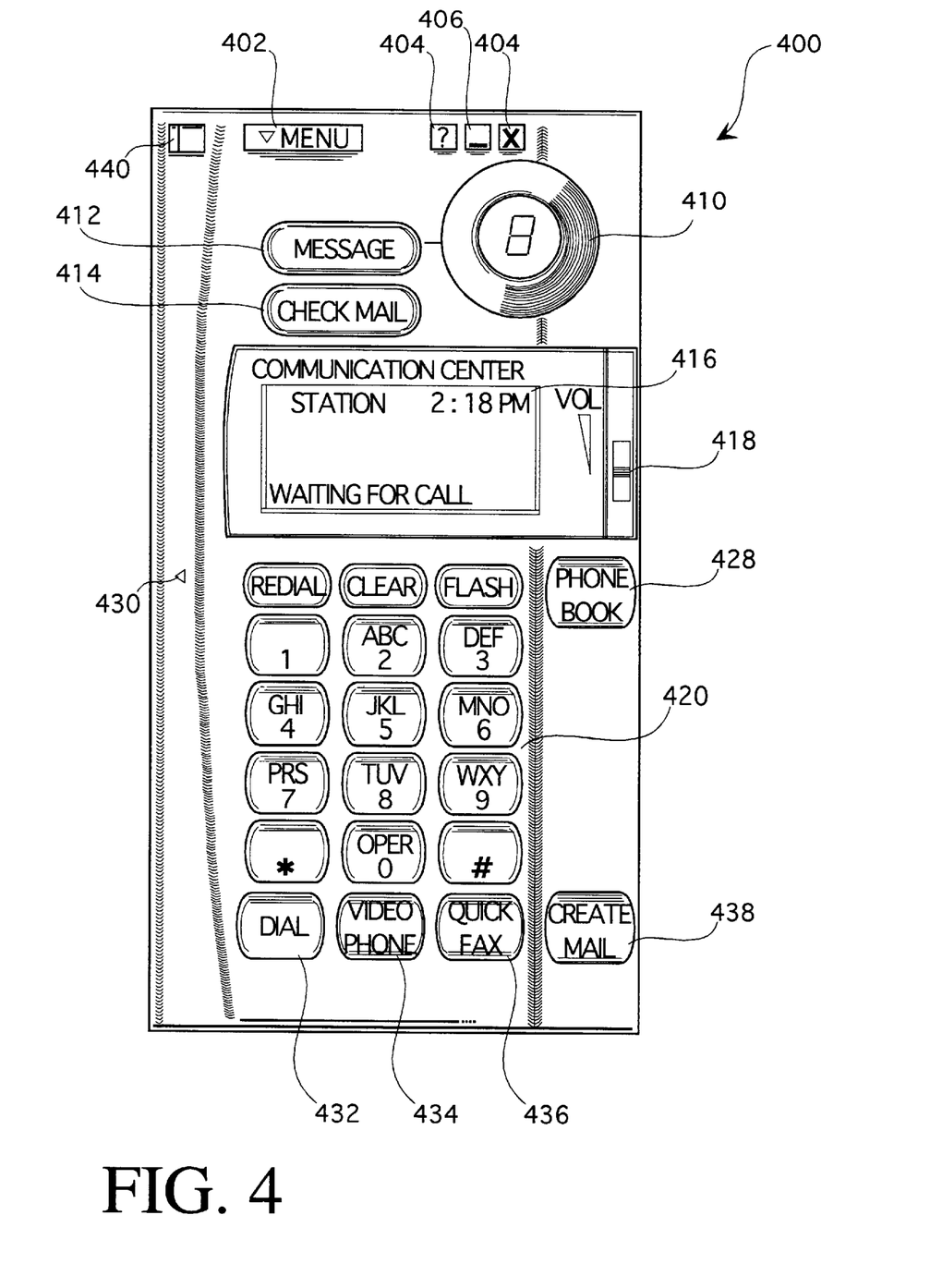
FIG. 4 illustrates the main user interface for the integrated communication center according to one embodiment of the present invention.

FIG. 4 illustrates the main screen of the user interface 302 for the integrated communication center according to one embodiment of the present invention. The user interface 302 provides the main point of user access to each of the separate communication applications illustrated in FIG. 3. In one embodiment of the present invention, the integrated communication center user interface 400 is depicted in the familiar form of a cellular telephone with a standard telephone numeric keypad 420 and an LCD graphical display 416. Integrated communication center interface 400 also includes an answering machine display, as well as several option buttons for accessing the various communications applications within the integrated communication center, and other functions typically available and associated with telephone communications. In one embodiment, user interface 400 provides the first level of user interface with the integrated communication center. Additional interface displays are provided in the form of extended display panels for the other applications within the integrated communication center.

In user interface 400, the option button 402 labeled "Menu" activates a pull-down menu that provides access to additional functions and options related to the main user interface of the integrated communication center. Option buttons 404, 406 and 408 are Windows 95 standard option buttons that provide access to functions related to the main user interface. Option button 404 (labeled "?") provides help information related to the integrated communication center; option button 406 (labeled "_") minimizes the integrated communication center into an icon which is displayed at the bottom of the screen; and option button 408, (labeled "X") closes the integrated communication center application. Option button 440 sizes the main graphical user interface 400 within the display screen of the host computer.

The next section of the main user interface relates to the answering machine function of the integrated communication center. Display 410 displays the number of messages which have been received by the host computer. Option button 412 brings up an extended panel for the message screen of the integrated communication center, and option button 414 brings up the e-mail application of the integrated communication center.

Display section 416 provides graphical display of the status of outgoing and pending telephone calls and e-mail transmissions from the integrated communication center. Display 416 provides various fields for displaying information related to communication activity. Information that may be displayed includes host station identification, current time, the telephone number or electronic address of the remote computer being called, and the status of the host station. Status information could include information such as whether the host computer is waiting for a call, a call is in process or has been interrupted, and other similar activity conditions. Option button 418 is a simulated slider control, that controls the volume with which messages and other audible information is transmitted through the speaker on the host computer. Numeric keypad 420 displays alphanumeric keys laid out in the same arrangement as those in a standard touch-tone telephone.

Also included in the main interface are several option buttons that provide functions similar to those found on standard touch-tone telephones. For example, dial option button 432 allows the user to initiate a telephone call and, when selected, produces an audible dial tone from the speaker of the host computer to alerts the user of a clear line. Redial option button 422 automatically redials the last number manually entered on touch pad 420. The clear option button 424 clears the memory that has been programmed with telephone numbers. The flash option button 426 allows a user to manually store a set number of telephone numbers.

Other option buttons included in the main user interface provide access to the other communication applications available in the integrated communication center. Phone book option button 428 provides access to an extension panel that displays stored remote phone numbers and identification information. The create mail option button 438 provides access to the e-mail application of the integrated communication center. Likewise, the quick fax option button 436 provides access to the fax communication application of the integrated communication center, and the video phone option button 434 provides access to the video phone application of the integrated communication center. Option button 430 is a toggle button that reveals or hides the extension panels for the various communication functions of the integrated communication center. In one embodiment, extension panels appear to slide into or slide out from the phone interface 400, when the user toggles option button 430.

Message Extended Panel

Figure 5:
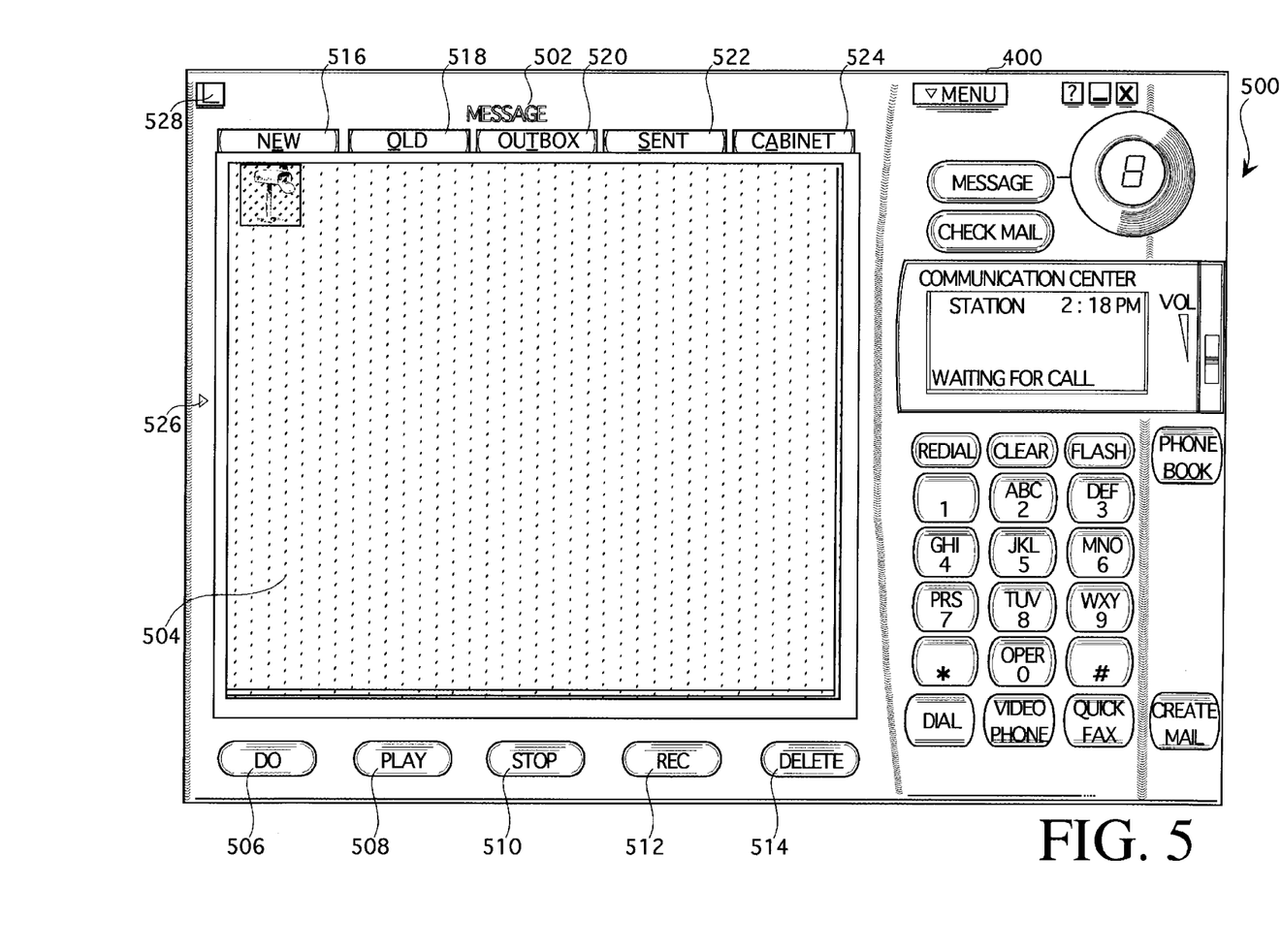
FIG. 5 illustrates the integrated communication center user interface with an extended message panel, according to one embodiment of the present invention.

When a user selects option button 412 labeled "Message" on the main user interface 400, an extended display panel for the message application is displayed. FIG. 5 displays the extended panel for the message application of the integrated communication center according to an embodiment of the present invention. The graphical user interface 500 for the message center includes the main user interface 400 and an extended message panel 502.

Extended message panel 502 includes an information display section 504 which lists various information items related to messages received by the integrated communication center. This information could include the name of the received message files, the size and type of files (i.e., voicemail, e-mail, fax), date and time of reception, sending party ID, and status of the message (i.e., received, error, or read). One or more of these items of information could be displayed either textually or graphically in the information display section 504. For example, the type of message received could be displayed as a diskette to indicate that it is an e-mail message or an envelope to indicate that it is a text message.

The extended message panel 502 provides access to various message functions which are arranged and displayed as file folders. For example, display 516, labeled "New" provides a display of new messages, that is messages which have not yet been read or accessed by the user. Folder 518 labeled "Old" displays messages which have been accessed by the user and archived or saved for later review. Folder 520, labeled "Outbox" displays messages which have been produced by the user for transmission, while folder 522 labeled "Sent" displays outgoing messages which have been sent by the user. Finally, folder 524 labeled "Cabinet" provides several options for the user to reorganize messages received or sent from the integrated communication center.

The message extended panel 502 has associated with it several option buttons which are displayed on the bottom of the user interface for controlling various functions related to the message center application of the integrated communication center. The "Do" option button 506 can be used to implement an action specified by the user. The "Play" option button 508 plays whatever message is highlighted in the display screen 504. The "Stop" option button 510 stops a message which is in process of being played. The "Record" option button 512 records a voicemail message which the user speaks into the microphone in the host computer, and the "Delete" option button 514 deletes any message highlighted in the display area 504.

Option button 526 collapses the extended message panel 502 resulting in the display of the main user interface 400 without an extended panel. Likewise, option button 528 serves to size the entire message panel user interface 500 on the host computer display.

Mailbox Extended Panel

Figure 6:
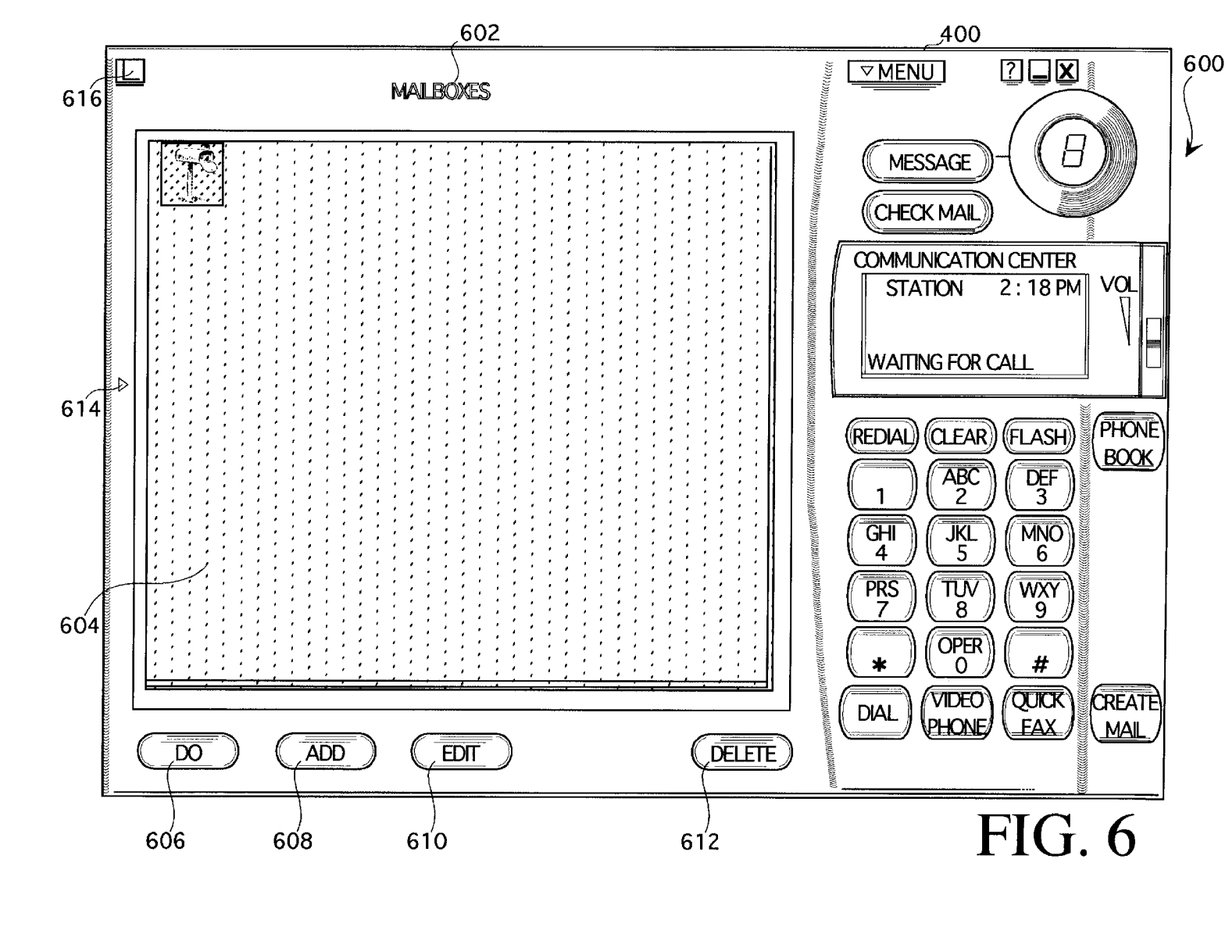
FIG. 6 illustrates the integrated communication center user interface with an extended mailbox panel, according to one embodiment of the present invention.

FIG. 6 illustrates the extended panel for the mailbox function of the integrated communication center, according to an embodiment of the present invention. The mailbox user interface includes the main integrated communication center user interface 400 and the mailbox extended panel 602. The mailbox extended panel 602 is displayed when the user selects the "Check Mail" option button 614 on the main user interface screen 400. The mailbox extended panel 602 provides the user with the status any e-mail, data, fax, or voicemail messages received by the host computer.

In an embodiment of the present invention, several mailboxes within the integrated communication center could be stored on a single host computer. Each one used by different users, or each one corresponding to a different account for a single user. Each of the separate mailboxes receives messages directed only to that mailbox, and likewise provides messages and status information related only to that particular mailbox. The mailbox extended panel includes a display screen 604 that displays the various mailboxes associated with a particular integrated communication center on the host computer. Each field within the display section 604 could contain various items of information related to a particular mailbox. This information could include the mailbox name or identifier, the status of messages for that mailbox, i.e., number of voice messages, faxes or e-mail messages received by the mailbox, as well as other like information.

The mailbox extended panel 602 has associated with it several option buttons that allow a user to control the functionality of the mailbox application of the integrated communication center. Option button 606 labeled "Do" implements or executes a chosen function when selected by the user. The "Add" option button 608 allows a user to add or define a mailbox by typing in the required information for that mailbox. As stated above, this information could include an identification number or name, an access or extension number, and any other security information, such as a password or log-in string. Option button 610 labeled "Edit" allows a user to edit information related to an existing mailbox. Finally, option button 612 labeled "Delete" allows a user to delete a predefined mailbox within the integrated communication center.

Option button 614 collapses the extended message panel 602 resulting in the display of the main user interface 400 without an extended panel. Likewise, option button 616 serves to size the entire mailbox user interface 600 on the host computer display.

Phone Book Extended Panel

Figure 7:
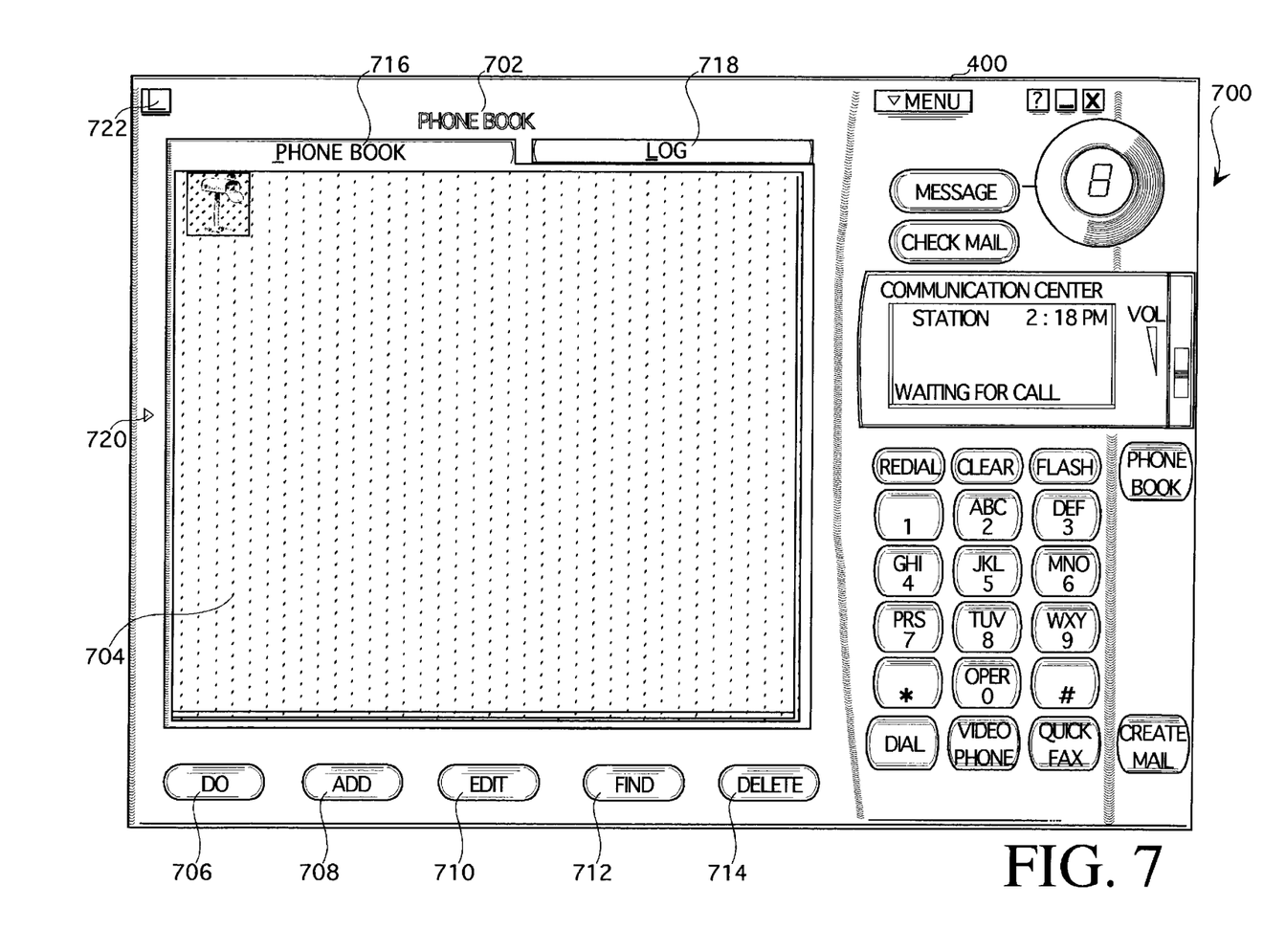
FIG. 7 illustrates the integrated communication center user interface with an extended phone book panel, according to one embodiment of the present invention.

FIG. 7 illustrates the extended panel for the phone book function of the integrated communication center, according to an embodiment of the present invention. The phone book function and user interface 700 is accessed by selecting the phone book option button 428 on the main user interface 400 for the integrated communication center. The phone book application allows a user to store and easily access phone numbers, e-mail addresses and other identification information related to frequently accessed remote computers or phones. The phone book user interface 700 includes the main integrated communication center interface 400 and a phone book extended panel 702.

In one embodiment, the phone book extended panel 702 includes two different screens that provide access to various functions of the phone book. The main phone book display screen 704 is accessed through option button 716 labeled "Phone Book". In one embodiment, the phone book display screen 704 lists the name, number, and other information for remote computers and phones which the user has stored. The information is stored in a database which can be sorted according to specific fields corresponding to the type of information represented. The information displayed in display screen 704 could be represented textually or graphically, for example a phone icon could indicate that the target is a phone, while a computer icon could indicate that the target is a remote computer.

The second display screen for the phone book application is available through the option button labeled "Log" 718. The log function displays a list of the most recently accessed users listed or stored in the phone book.

The phone book extended panel 702 also includes several option buttons that provide access to various functions related to the phone book function of the integrated communication center. The "Do" option button 706 provides executes a particular operation selected by the user. The "Add" option button 708 allows a user to add a name and phone number to the phone book database. The "Edit" option button 710 allows a user to edit an existing entry in the phone book database. The "Find" option button 712 allows a user to find an entry in the phone book database by typing a text string which identifies the desired phone book entry, and the "Delete" option button 714 allows a user to delete an existing entry from the phone book database.

Option button 720 collapses the extended message panel 702 resulting in the display of the main user interface 400 without an extended panel. Likewise, option button 722 serves to size the entire phone book user interface 700 on the host computer display.

Greetings Extended Panel

The integrated communication center also provides a way for the user to specify and create custom greetings for the various mailboxes may be available for a particular host computer. The greetings function and user interface is accessed by selecting the menu option button 402 on the main user interface 400 for the integrated communication center.

Figure 8:
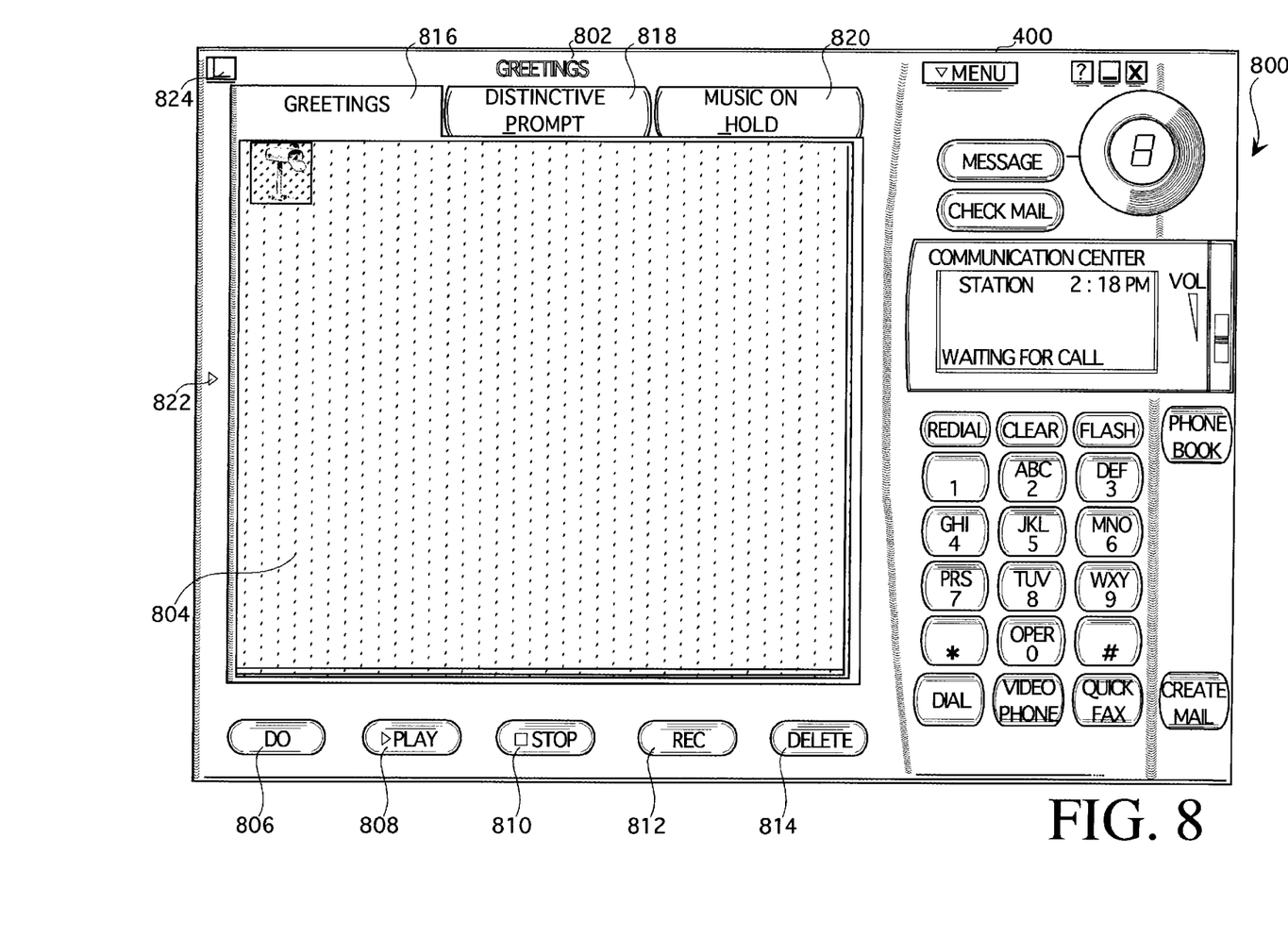
FIG. 8 illustrates the integrated communication center user interface with an extended greetings panel, according to one embodiment of the present invention.

FIG. 8 illustrates the user interface of the extended panel for the greetings function of the integrated communication center according to one embodiment of the present invention. The greetings function user interface 800 includes the main integrated communication center user interface 400 as well as an extended greetings panel 802. In one embodiment, extended greetings panel 802 includes a greetings display area 804 accessed by the "Greetings" option button 816. The greetings display area 804 displays identifiers for greetings associated with each mailbox in the host computer, along with other information such as the creation time, creation date, length of greeting, and type of greeting. One or more of the items of information pertaining to a greeting could be displayed in text or graphic form.

The greetings extended panel 802 also includes separate display areas for other greeting functions. Option button 818, labeled "Distinctive Prompt" brings up a display area which lists the various prompts or messages associated with each mailbox. Option button 820, labeled "Music on Hold" lists names of music clips or audio strings to be played in the background when a remote station is placed on hold.

The greetings user interface 800 has associated with it various option buttons that allow a user to control various aspects of the greeting function of the integrated communication center. The "Do" option button 806 allows the user to execute a selected operation. The "Play" option button 808 allows a user to play highlighted or selected greeting or background music clip. The "Stop" option button stops the playing of a selected message or greeting. The "record" option button 812 allows a user to record a greeting or music sample which is dictated or played into the microphone of the host computer, and the "Delete" option button allows a user to delete a highlighted or selected greeting or music clip.

Option button 822 collapses the extended message panel 802 resulting in the display of the main user interface 400 without an extended panel. Likewise, option button 824 serves to size the entire greetings user interface 800 on the host computer display.

In other embodiments of the present invention, extension panels are provided for other communication applications available within the integrated communication center. For example, an extension panel displaying a web browser interface could be opened when the web browser application is selected under the menu selection area of the main interface 400. Similarly, a fax extension panel could be displayed for the creation of a fax message when the Quick Fax option button 436 in the main interface 400 is selected, or an e-mail extension panel could be displayed for the creation of an e-mail message when the Create Mail option button 438 in the main interface 400 is selected.

Figure 9:
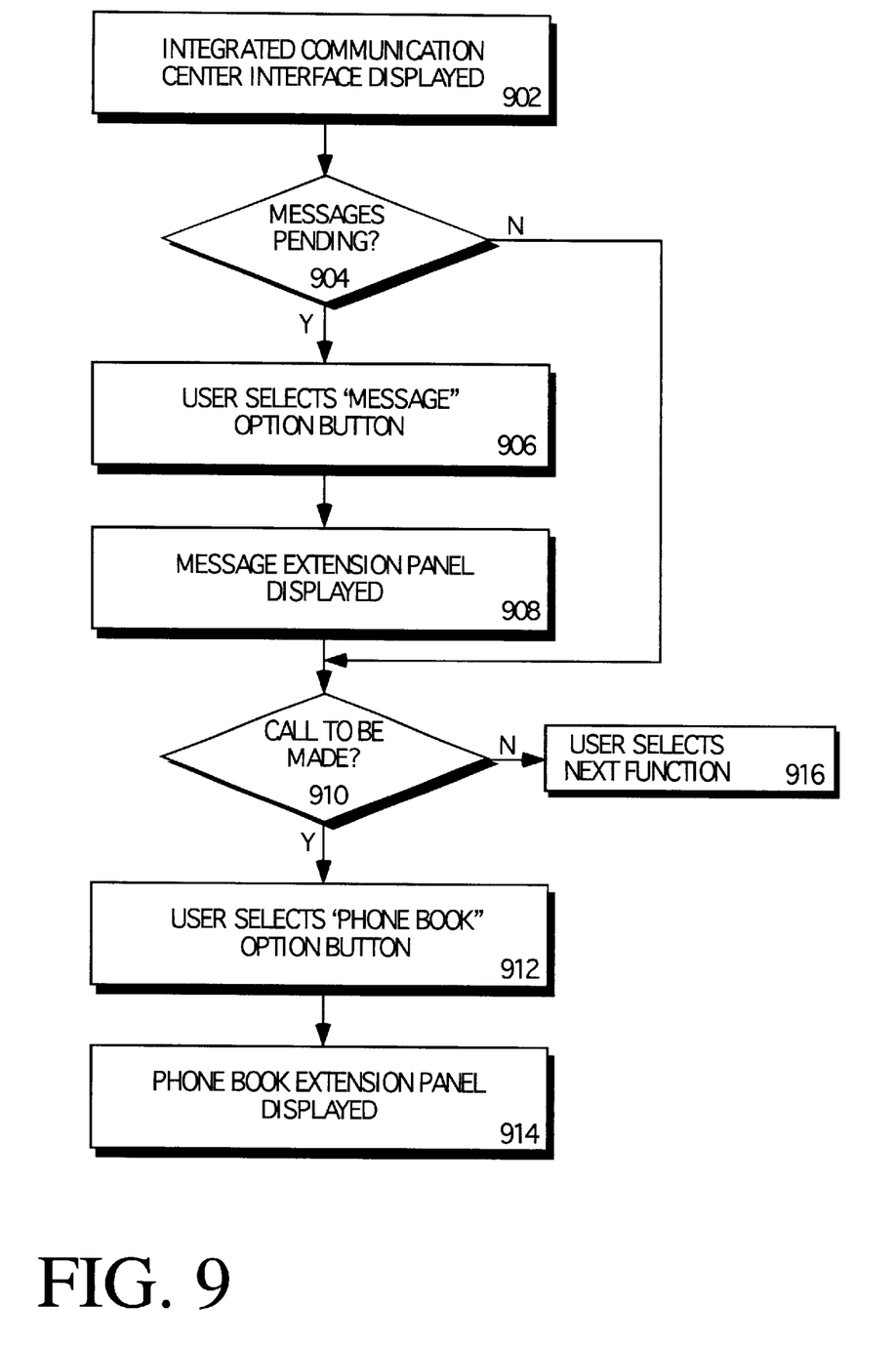
FIG. 9 is a flowchart illustrating the steps of accessing message and mail functions in the integrated communication center according to a method of the present invention.

FIG. 9 is a flowchart illustrating the steps of accessing message and mail functions in the integrated communication center according to a method of the present invention. The user starts by launching the integrated communication center program on the host computer. In step 902, the integrated communication center main interface, as illustrated in FIG. 4, is displayed. In one embodiment of the present invention, the integrated communication center interface 400 provides a cellular telephone like display with an integrated message center display. The user first checks to see whether any messages are pending by viewing display area 410 on main user interface 400. The number of messages pending will be displayed in the display area 410.

If, in step 904, it is determined that messages are pending, the user selects the message option button 412 of main user interface 400, step 906. Upon selecting the message option button the message extension panel 502 is displayed as an extension of main user interface 400 (as shown in FIG. 5), step 908. Display field 504 in message extension panel 502 lists the pending messages according to type, size, sending party, and other information. Using the option buttons in message extension panel 500 the user can play or otherwise process the pending messages.

In step 910, it is determined whether the user will initiate a telephone call or communication session from the host computer. If a call is to be made, the user may select the phone book option button 428 in main user interface 400, step 912. Selecting the phone book option button causes the phone book extension panel to be displayed, step 914. The phone book extension panel is illustrated as extension panel 702 in FIG. 7. Display field 704 in phone book interface 700 lists various numbers or e-mail addresses for remote phones or computers that have been stored in a phone book database. The user may select a pre-stored remote number or address, or the user can input the phone number or the e-mail address of the remote client directly, using the numeric keypad 420 on the main user interface 400. If, in step 910, it is determined that a call is not to be made, the user is free to select another function within the integrated communication center, step 916.

Once the user has input the address or phone number of the remote client, using either an existing entry in the phone book database or by directly typing in the number or address from the keypad, the user can select the type of communication to be initiated, such as a fax, e-mail message, or speaker or video phone conversation using the option buttons in the main user interface 400.

Figure 10:
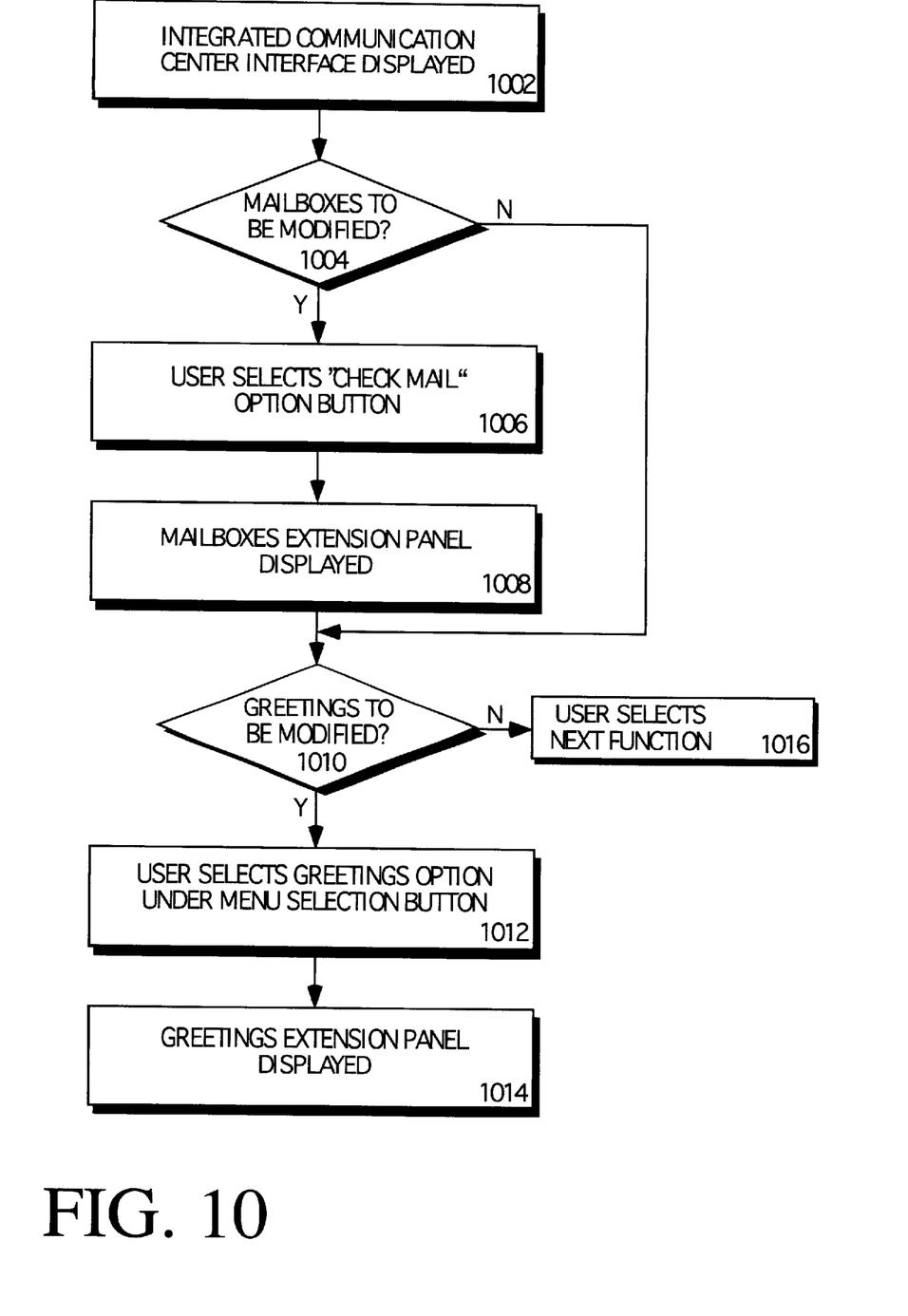
FIG. 10 is a flowchart illustrating the steps of accessing phone book and greeting functions in the integrated communication center according to a method of the present invention.

FIG. 10 is a flowchart illustrating the steps of accessing phone book and greeting functions in the integrated communication center according to a method of the present invention. The integrated communication center interface 400 is displayed in Step 1002. In step 1004 it is determined whether the mailbox database is to be modified. If the mailbox function is to be modified, the user selects the check mail option button 414 in the main user interface 400, step 1006. Upon selecting the check mail option button, the mailbox extension panel 602 is displayed as an extension of the main interface 400 (as shown in FIG. 6), step 1008. Information regarding existing mailboxes is listed in display area 604 of the mailbox extension panel 602. The user can add, edit, or delete mailboxes using the option buttons in extension panel 602.

If, in step 1004, it is determined that mailboxes are not to be modified, the user may decide to modify the greetings function, step 1010. If it is determined that greetings are to be modified, the user selects the greetings option button under the menu selection button 402 in main user interface 400, step 1012. Upon selecting the greetings option, the greetings extension panel 802 within the greetings user interface 800 is displayed, step 1014. The greetings extension panel is illustrated as extension panel 802 in FIG. 8. Greetings extension panel 802 includes a display area 804 for listing existing greetings that have been programmed into the integrated communication center. The user can play existing greetings, record new greetings, or delete existing greetings using the option buttons in greetings extension panel 802.

If, in Step 1010, it is determined that greetings are not to be modified, the user is free to select another function within the integrated communication center, step 1016. These other functions include accessing a web browser, initiating a speaker phone, video phone or e-mail communications session or other similar communication functions.

In the foregoing, a system has been described for integrating various communication functions in a single graphical user interface. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of integrating a plurality of communication programs in a computer system, the method comprising the steps of:

displaying a first graphical user interface screen on a display device of said computer system, said graphical user interface including a first plurality of option buttons which, when selected by a sender, enable the sender to communicate with a receiver using a corresponding sender selected communication program of said plurality of communication programs; and     displaying a second graphical user interface screen on said display device when an option button corresponding to a first communication program of said plurality of communication programs is selected, said second graphical user interface screen depicted as an extension panel of said first graphical user interface screen, wherein the extension panel is adjacent to the first graphical user interface display and appears to extend from the side of the first graphical user interface screen.

2. A method according to claim 1 wherein said first graphical user interface screen comprises a numeric keypad field, a communication display field, a message display field, and said first plurality of option buttons.

3. A method according to claim 2 wherein said first graphical user interface screen is depicted as a cellular phone.

4. A method according to claim 2 wherein said a plurality of communication programs comprise a speaker phone program, a video phone program, an electronic mail program, a fax program, and a web browser program.

5. A method according to claim 2 wherein said second graphical user interface screen comprises a message display screen, said message display screen including:

a first display area, said first display area configured to display one or more data files sent or received by said computer system, said one or more data files corresponding to files created or readable by said a plurality of communication applications; and     and a second plurality of option buttons, said second plurality of option buttons configured to control the playing or creation of said one or more data files.

6. A method according to claim 2 wherein said second graphical user interface screen comprises a mailbox display screen, said mailbox display screen including:

a first display area, said first display area configured to display identification information regarding one or more storage locations defined on said computer system, each storage location of said a plurality of storage locations capable of storing data files created by said one or more communication programs; and and a second plurality of option buttons, said second plurality of option buttons configured to control the creation or modification of said identification information.

7. A method according to claim 2 wherein said second graphical user interface screen comprises a phone book display screen, said phone book display screen including:

a first display area, said first display area configured to display identification information regarding one or more remote devices accessible by said computer system, said identification information stored on a database in said computer system, and comprising a remote device identifier and remote device phone number or electronic address; and and a second plurality of option buttons, said second plurality of option buttons configured to control the creation or modification of said identification information.

8. A method according to claim 2 wherein said second graphical user interface screen comprises a greeting display screen, said greeting display screen including:

a first display area, said first display area configured to display identification information regarding one or more greeting messages associated with one or more message mailboxes stored in said computer system, said one or more greetings comprising audio data capable of being played back on a remote device accessed by said computer system; and and a second plurality of option buttons, said second plurality of option buttons configured to create or modify said one or more greetings messages displayed on said first display area.

9. A method according to claim 5 wherein the number of data files received by said computer system is displayed as a numeral in said message display field.

10. A method according to claim 3 wherein said first graphical user interface screen includes an extension panel option button, said extension panel option button configured to:

reveal said second graphical user interface screen extension panel when selected a first time; and hide said second graphical user interface screen extension panel when selected a second time.

11. A method according to claim 1 further comprising the step of providing data translation programs which allow data produced by a communication program of said plurality of communication programs to be processed by another communication program of said plurality of communication programs.

12. A computer comprising a graphical user interface for display on a display device, said graphical user interface comprising:

a first interface screen including a first display area, a second display area, an alpha-numeric keypad and a first plurality of option buttons which, when selected by a sender, enable the sender to communicate with a receiver using a corresponding sender selected communication program of said plurality of communication programs; and a second interface screen, said second interface screen displayed when an option button corresponding to a first communication program is selected, said second interface screen depicted as an extension panel of said first interface screen, wherein the extension panel is adjacent to the first graphical user interface display and appears to extend from the side of the first graphical user interface screen.

13. A computer according to claim 12 wherein said plurality of communication programs comprise a speaker phone program, a video phone program, an electronic mail program, a fax program, and a web browser program.

14. A computer according to claim 13 wherein said first interface screen comprises a graphical user interface for said plurality of communication programs depicted as a cellular phone.

15. A computer according to claim 14 wherein said second interface screen is depicted as an extension panel connected to said cellular phone image.

16. A computer according to claim 15 wherein said graphical user interface includes a display option button configured such that, said second interface screen is revealed when said display option button is selected a first time; and said second interface screen is hidden when said display option button is selected a second time.

17. A computer according to claim 16 further comprising:

a processor;

a modem coupled to said processor, said modem operable to communicate between said computer and one or more remote terminals over a phone line; and a network interface device coupled to said processor, said network interface device operable to communicate between said computer and a remote computer over a network medium; and wherein said second interface screen comprises;

a communication display area which displays information regarding data files sent and received by said computer through said modem or said network interface device; and a plurality of command buttons which control the creation or playback of said data files sent and received by said computer.

18. A computer according to claim 17 wherein said second interface screen comprises:

a communication display area configured to display information regarding identification and access of said remote devices or said remote computers accessible by said computer, and data files sent and received by said computer through said modem or said network interface device; and a plurality of command buttons configured to control the creation or modification of said information.

19. A computer readable medium having stored thereon sequences of instructions which are executable by a processor, and which, when executed by the processor, cause the processor to perform the steps of:

displaying a first graphical user interface screen on a display device of a computer system, said graphical user interface including a first plurality of option buttons which, when selected by a sender, enable the sender to communicate with a receiver using to a corresponding sender selected communication program of said plurality of communication programs; and displaying a second graphical user interface screen on said display device when an option button corresponding to a first communication program of said plurality of communication programs is selected, said second graphical user interface screen depicted as an extension panel of said first graphical user interface screen, wherein the extension panel is adjacent to the first graphical user interface display and appears to extend from the side of the first graphical user interface screen.

20. A computer readable medium according to claim 19 wherein said first graphical user interface screen comprises a numeric keypad field, a communication display field, a message display field, and said first plurality of option buttons, and wherein said first graphical user interface screen is depicted as a cellular phone.

21. A computer readable medium according to claim 20 wherein said plurality of communication programs comprise a speaker phone program, a video phone program, an electronic mail program, a fax program, and a web browser program.

22. A computer readable medium according to claim 21 wherein said first graphical user interface screen includes an extension panel option button, said extension panel option button configured to:

reveal said second graphical user interface screen extension panel when selected a first time; and hide said second graphical user interface screen extension panel when selected a second time.

23. A computer comprising:

a processor;

a display device coupled to the processor; and a memory coupled to the processor, the memory having contained therein sequences of instructions which, when executed by the processor, cause the processor to perform the steps of:

displaying a first graphical user interface screen on said display device, said graphical user interface including a first plurality of option buttons which, when selected by a user, provide access to a corresponding communication program of one or more communication programs executable by said processor; and displaying a second graphical user interface screen on said display device when an option button corresponding to a first communication program is selected, said second graphical user interface screen depicted as an extension panel of said first graphical user interface screen, wherein the extension panel is adjacent to the first graphical user interface display and appears to extend from the side of the first graphical user interface screen.

* * * * *